United States Patent [19]

Look et al.

[11] 4,090,684

[45] May 23, 1978

[54] STOWABLE AIRFOIL STRUCTURE

[75] Inventors: Lance G. Look, Traverse City; David G. Erickson, Williamsburg, both of Mich.

[73] Assignee: The United States of America as represented by the Secretary of the Air Force, Washington, D.C.

[21] Appl. No.: 788,495

[22] Filed: Apr. 18, 1977

Related U.S. Application Data

[63] Continuation of Ser. No. 669,948, Mar. 24, 1976, abandoned.

[51] Int. Cl.² ............................ B64C 3/54; B64C 3/56
[52] U.S. Cl. ........................................ 244/218; 244/49
[58] Field of Search ................. 244/218, 219, 215, 49

[56] References Cited

U.S. PATENT DOCUMENTS

| | | | |
|---|---|---|---|
| 1,742,910 | 1/1930 | Grinoch et al. | 244/218 |
| 2,596,436 | 5/1952 | Robert | 244/49 |
| 3,666,210 | 5/1972 | Look et al. | 244/218 |

*Primary Examiner*—Barry L. Kelmachter
*Attorney, Agent, or Firm*—Joseph E. Rusz; Jacob N. Erlich

[57] ABSTRACT

The stowable airfoil structure is a tapered, high aspect ratio, retractable and foldable wing for aircraft which provides minimum aerodynamic drag during launch and minimum space for ground storage. The airfoil utilizes a forward leading edge box section to which is attached a plurality of spanwise channels hinged together for movement in a chordwise direction. Retraction of these elements takes place by the utilization of suitable actuators so as to move the hinged elements forwardly in a nested position thereby substantially reducing the width of the wing or airfoil which is then folded to lie along side the fuselage of an aircraft.

1 Claim, 8 Drawing Figures

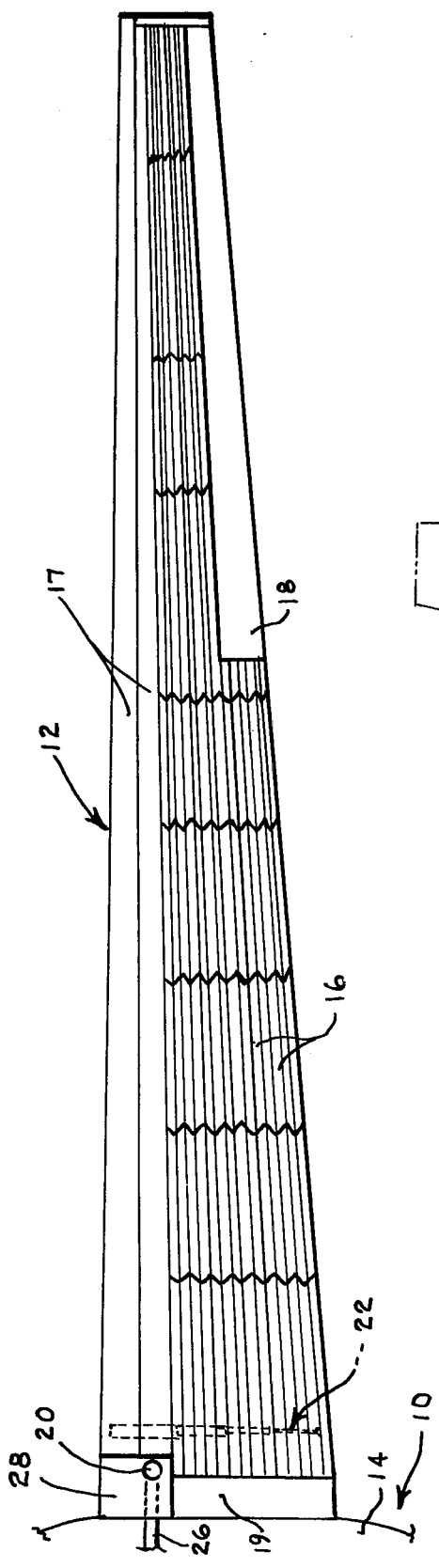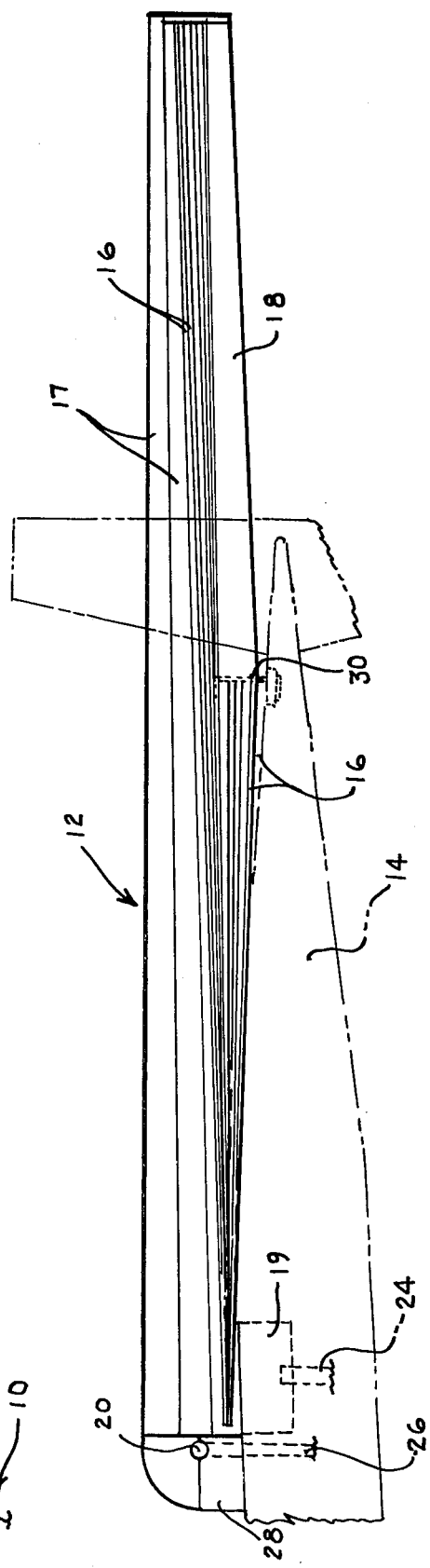

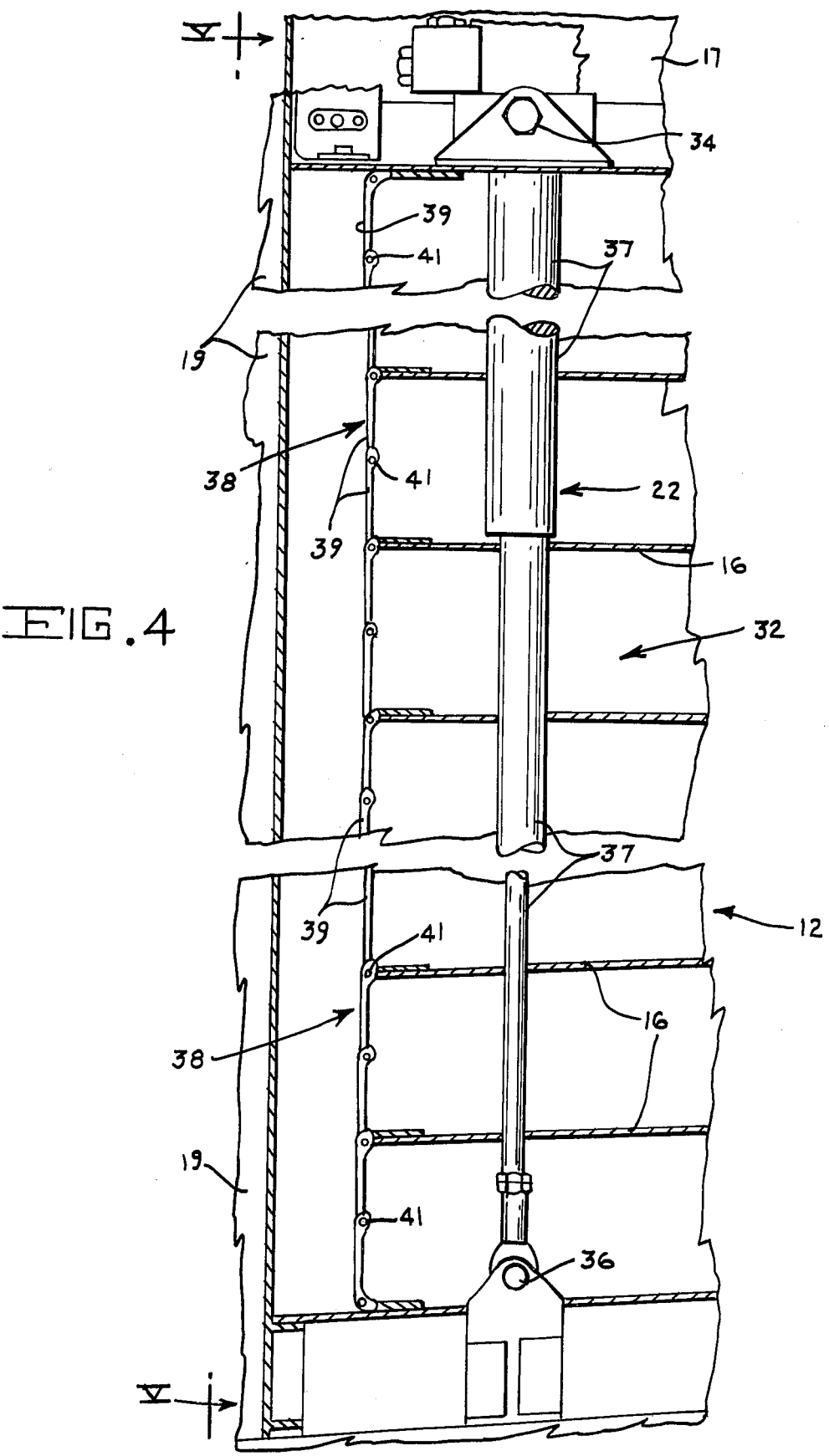

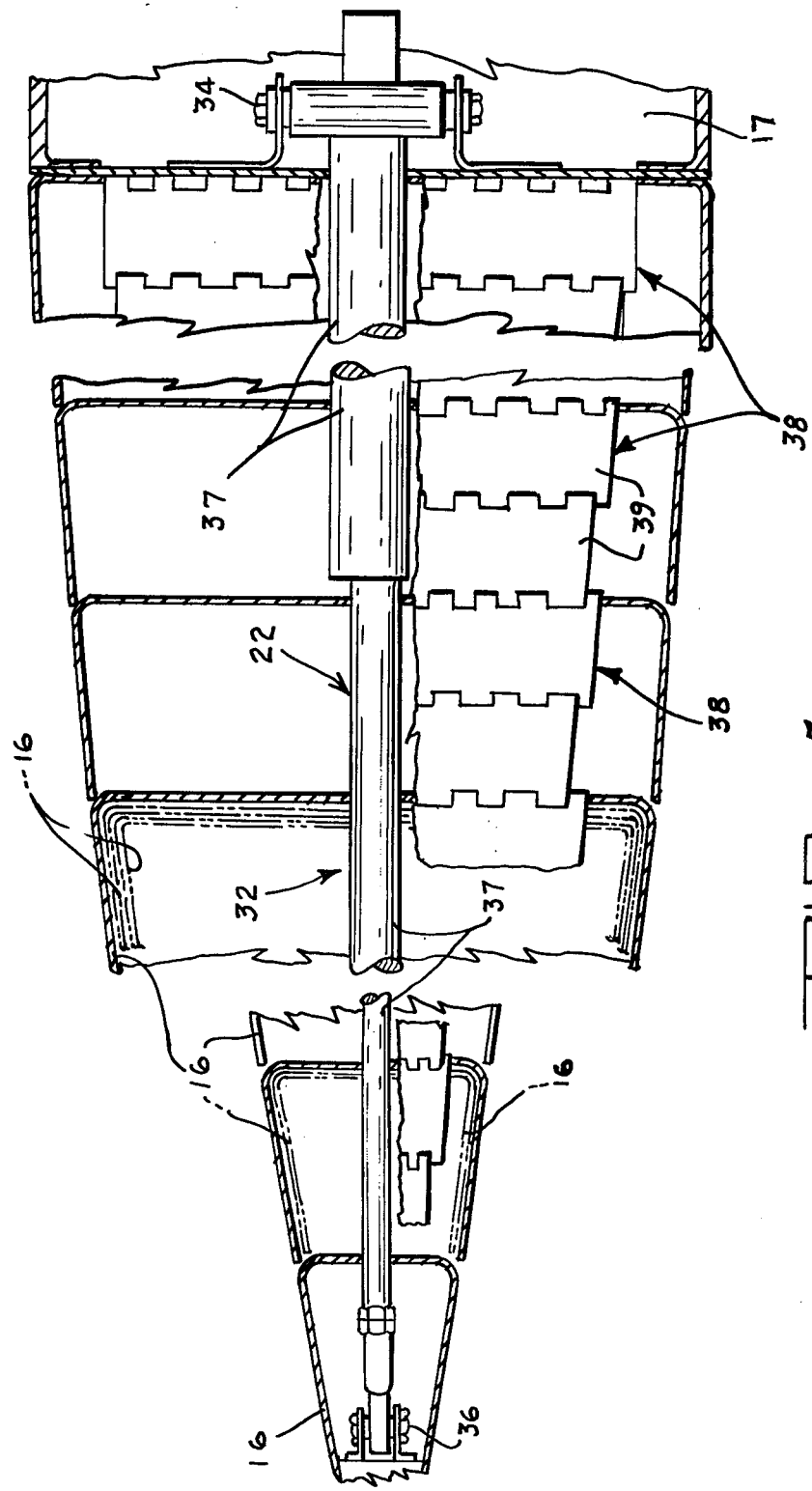

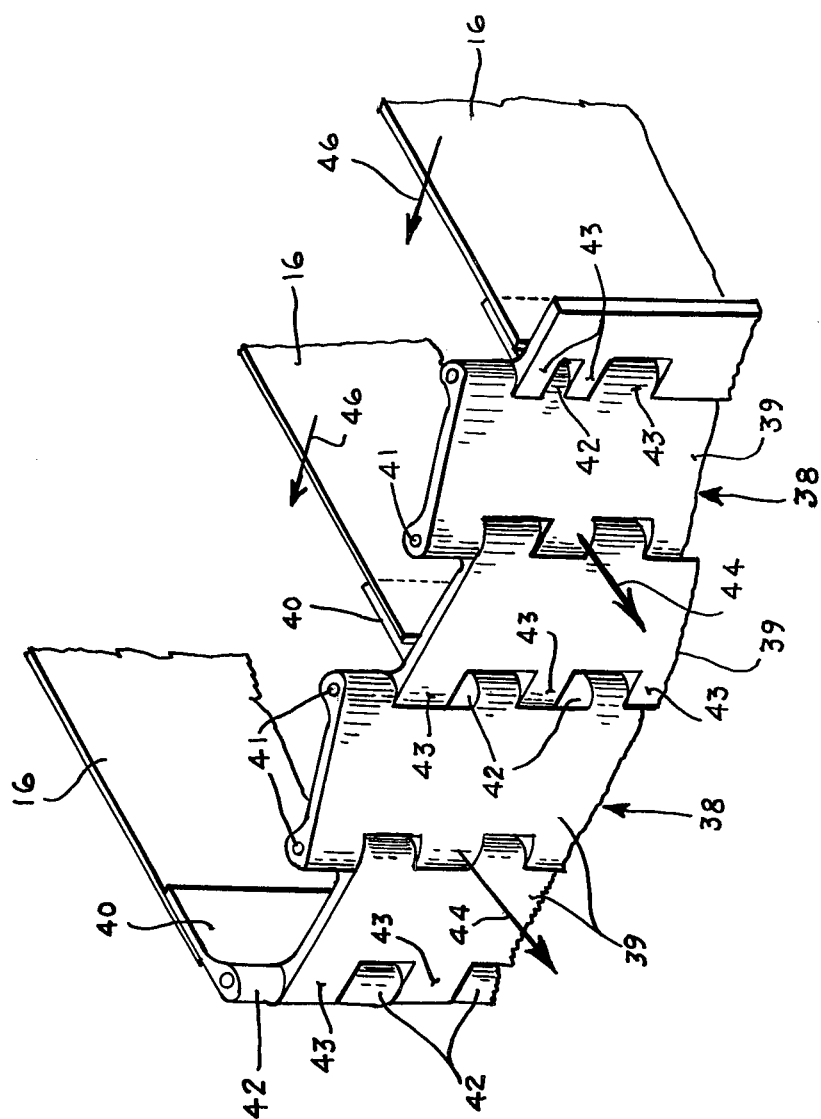

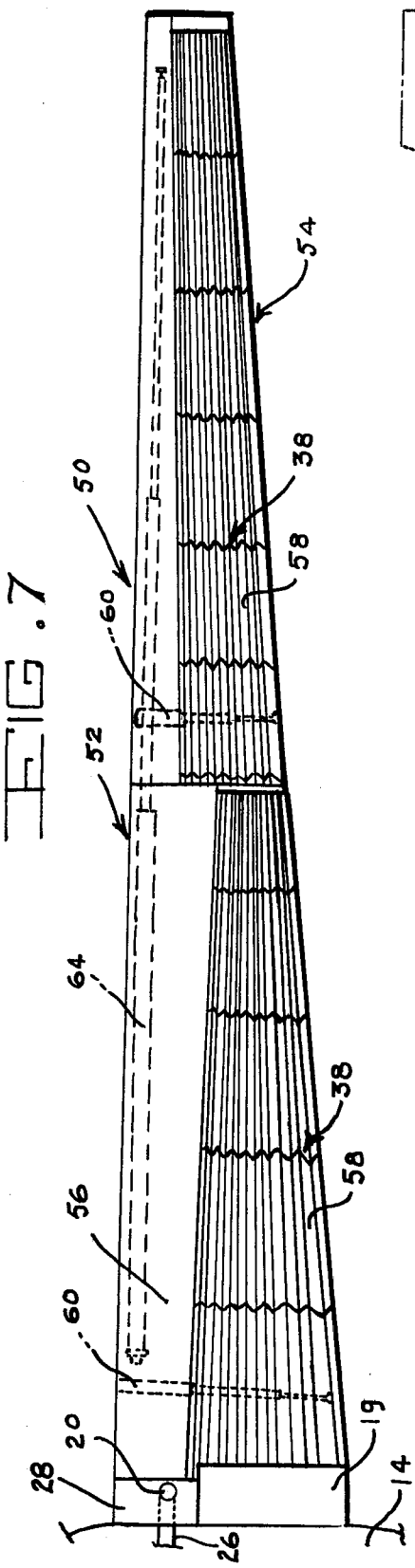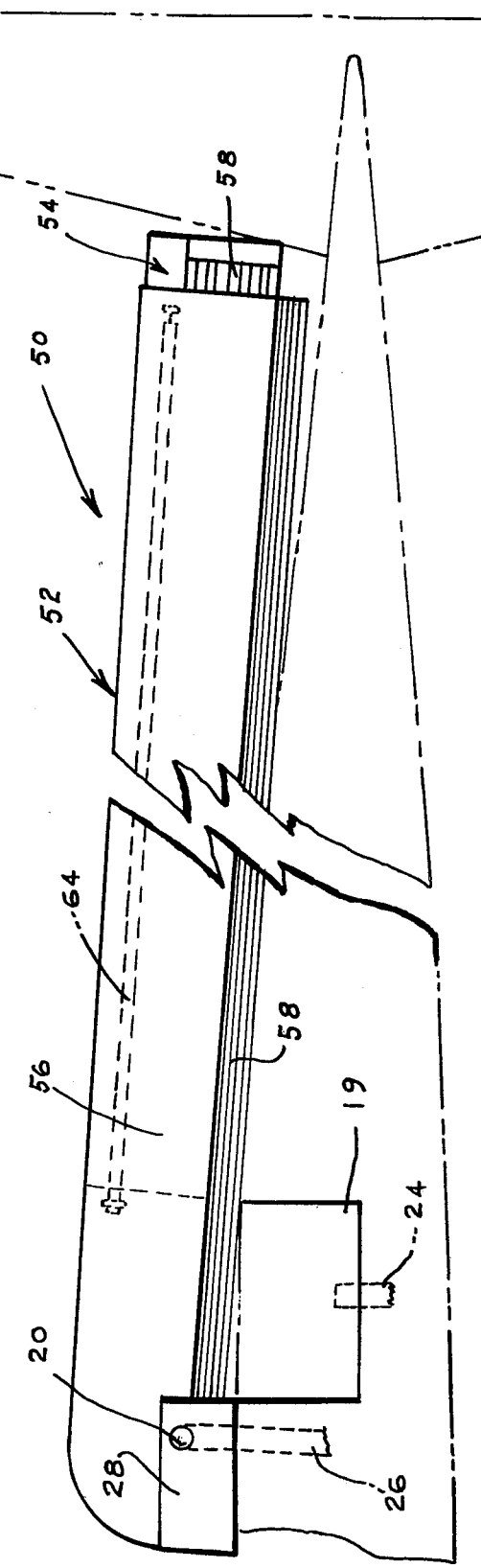

STOWABLE AIRFOIL STRUCTURE

STATEMENT OF GOVERNMENT INTEREST

The invention described herein may be manufactured and used by or for the Government for governmental purposes without the payment of any royalty thereon.

This is a continuation of application Ser. No. 669,948, filed Mar. 24, 1976 now abandoned.

BACKGROUND OF THE INVENTION

This invention relates generally to variable area or geometry aerodynamic or airfoil structures, and, more particularly to airfoils capable of variation between fully deployed, aerodynamic functional configurations and contraction by spanwise elements, subsequently folded to the stowed position.

Variable area geometric airfoils have been utilized in a number of aerodynamic vehicles, principally for the purpose of effective stowage by virtue of compaction and of improvement of aerodynamic efficiency under specific flight conditions. It is well known, for example, to provide telescoping airfoils that may be extended in the spanwise direction from a compacted stowage configuration for flight purposes. It is also known to employ various forms of pivoted wing configurations for purposes of stowage or various operations. Apart from the familiar wing structure used on carrier based aircraft, few of such structures have either proved practical or met the requirements of retraction in the chordwise direction by a plurality of spanwise elements.

Such a stowable configuration is extremely important since it is capable of meeting many of the design configurations of modern aircraft such as (1) satisfying the requirements of not substantially increasing structural weight and (2) meeting aircraft operative limitations while remaining reliable in operation. Past variable wing configurations have generally imposed excessive weight penalties, or afforded inadequate structural properties, or required complex and cumbersome retraction mechanisms which were less than reliable during operating conditions.

SUMMARY OF THE INVENTION

The instant invention sets forth a stowable airfoil structure which is capable of retraction in the chordwise direction by the utilization of a plurality of uniquely mounted and designed spanwise elements and the subsequent folding of the airfoil in order to overcome the problems set forth in detail hereinabove.

The instant invention finds its primary usage in conjunction with conventional aircraft or drones in which it is required to provide optimum stowability and minimal drag for aerial launch and retrieval of the subject vehicle. It should be noted, however, that this design may also find utility in a number of instances where compactness of design is required.

The airfoil structure of this invention is pivotally mounted to the fuselage of an aircraft and utilizes a forward leading edge box section which comprises approximately one-third the width or chord of the wing. Attached to this leading box section are a plurality of spanwise channels or U-shaped elements which are hinged together for movement in a chordwise direction by any conventional actuator, either hydraulic or electrical. Retraction of these elements cause the elements to move in the chordwise direction and to nest within themselves thereby substantially reducing the width of the wing. Subsequent to the retraction procedure the entire airfoil or wing is folded or pivoted to lie along side the fuselage of the aircraft for purposes of stowage or launching under certain conditions.

In order to further reduce the overall length of the airfoil of this invention it is possible, in a second embodiment of this invention, to utilize a two part wing structure which includes an inner or root section and an outer or tip section with less span than the inner. After the spanwise elements of both sections have been retracted to the nested position as set forth hereinabove, the outer section of the wing is telescoped into the box or inner section and the two part structure is then folded against the fuselage.

It is therefore an object of this invention to provide a stowable airfoil structure which is capable of retraction in the chordwise direction by a plurality of hinged spanwise elements.

It is another object of this invention to provide a stowable airfoil structure which is capable of providing compactness and in addition eliminate disproportionately high tooling, fixture and related fabrication costs.

It is a further object of this invention to provide a stowable airfoil structure which allows the right and left hand folding components thereof to be interchangeable.

It is another object of this invention to provide a stowable airfoil structure which provides sufficient strength during operation.

It is still a further object of this invention to provide a stowable airfoil structure which is economical to produce, highly reliable in operation and which utilizes conventional, currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DESCRIPTION OF THE DRAWING

FIG. 2 is a plan view of the stowable airfoil structure of this invention shown in the extended or operational position;

FIG. 3 is a plan view of the stowable airfoil structure of this invention shown in the retracted and folded position along side the fuselage of an aircraft;

FIG. 4 is a fragmented plan view of the stowable airfoil structure of this invention shown partly in cross-section;

FIG. 5 is a side elevational view of the stowable airfoil structure of this invention taken in the direction V—V of FIG. 4 and shown partly in cross-section with a U-shaped element thereof shown in phantom in the nested position;

FIG. 6 is a pictorial representation of the hinges of the stowable airfoil structure of this invention;

FIG. 7 is a plan view of another embodiment of the stowable airfoil structure of this invention shown in the extended or operational position; and FIG. 8 is a plan view of the other embodiment of the stowable airfoil structure of this invention shown in FIG. 7 in the retracted, telescoped and folded position along side the fuselage of an aircraft.

DETAILED DESCRIPTION OF THE PREFERRED EMBODIMENTS

Figure 1:
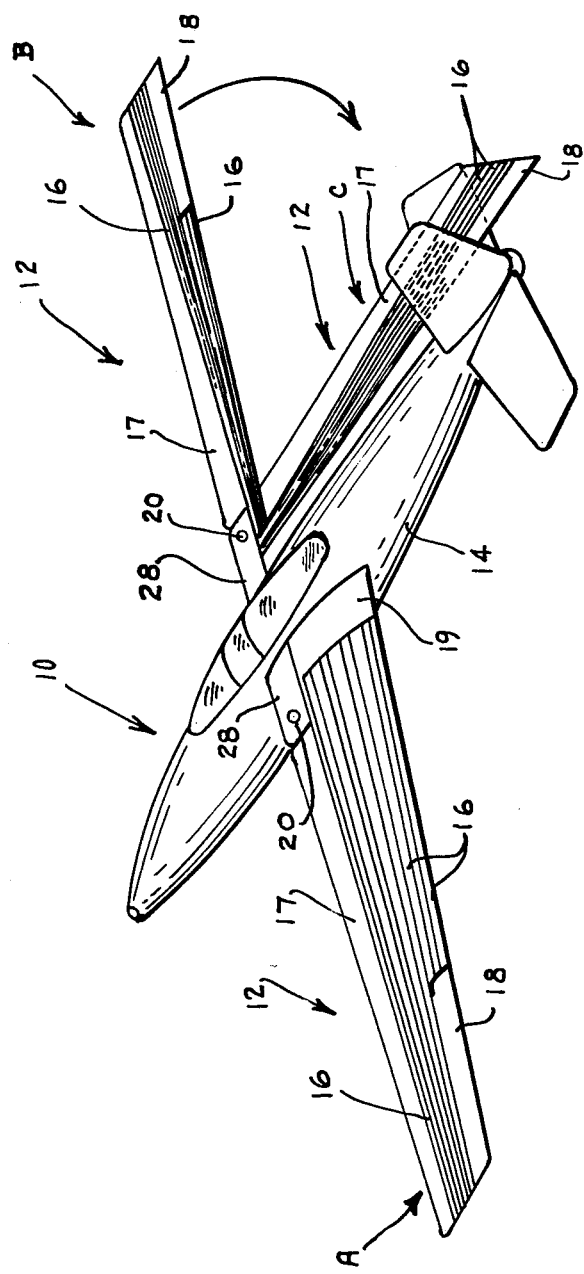
FIG. 1 is a pictorial representation of an aircraft utilizing the stowable airfoil structure of this invention with the airfoil structure being shown in the extended or operative position, the retracted position and the folded position.

Reference is now made to FIG. 1 of the drawing which shows in pictorial fashion a conventional drone or aircraft 10 which incorporates therein the stowable airfoil structure 12 of this invention. Airfoil structure 12 is shown in the drawing as being fully extended and operable at A, fully extended and retracted at B and retracted and pivotally folded against the fuselage 14 of aircraft 10 at C. Although two such airfoil structures 12 are required by conventional aircraft, this disclosure and drawing will mainly represent only one such structure 12. However, where another structure is shown, for purposes of clarity, identical numerals will depict identical elements in each airfoil structure 12.

As shown in FIGS. 1-3 the airfoil structure 12 of this invention is made up of a plurality of spanwise channels or U-shaped elements 16 which are hinged together in a manner to be described in detail hereinbelow for movement in the chordwise direction. The plurality of U-shaped elements 16 comprise approximately two-thirds of the total airfoil structure with the remainder being made up of non-retractable box section or element 17, ailerons 18 and supporting structure 19. The entire structure 12 is also pivotally mounted at 20 to the fuselage 14 of aircraft 10.

One or more conventional hydraulic or electrical actuators 22 are secured between trailing element 16 and box section 17 thereby providing for the systematic retraction of U-shaped elements 16 within themselves in a manner to be described in detail hereinbelow. In addition to actuators 22, any suitable hydraulic or electrical actuator 24 schematically shown in FIG. 3 are utilized to withdraw support structure 19 within fuselage 14. Other conventional actuators 26 shown schematically in FIGS. 2 and 3 are utilized to pivot the retracted airfoil structure 12 about pivot point 20 of support 28 of aircraft 10 to the position shown in FIG. 3 of the drawing. Any suitable locking member 30 retractably mounted on fuselage 14 is used to securely position the folded airfoil structure 12 along side fuselage 14.

Reference is now made to FIGS. 4 and 5 of the drawing which show in detail the retracting mechanism 32 utilized in the operation of the instant invention. Retracting mechanism 32 is made up of at least one conventional hydraulic or electrical actuator 22 secured at one end 34 to the box section or supporting structure 17 of airfoil structure 12 and secured at the other end 36 to the trailing edge of airfoil structure 12. Actuator 22 takes the form of a plurality of telescoping elements 37 which withdraw within one another during the retracting operation.

In addition to actuator 22 retracting mechanism 32 is made up of a plurality of hinge assemblies 38. Each hinge assembly 38 comprises of a pair of plates 39 pivotally secured to one another at 41. These hinge assemblies 38 are also pivotally secured to channel shaped spanwise elements 16 in a manner to be described in detail hereinbelow with respect to FIG. 6. Hinge assemblies 38 transmit the developed airload distribution of each and all elements 16 back to the primary support structure 17. As can be seen from FIGS. 4 and 5 and as shown in phantom in FIG. 5, upon retraction of elements 37 of actuator 22, channel or U-shaped elements 16 nest within one another in an extremely compact configuration so as to reduce the overall chordwise dimension of airfoil structure 12.

Referring to FIG. 6 of the drawing each hinge assembly 38 is pivotally secured to one another as well as to lugs 40 which are fixedly secured by any suitable securing method such as welding to channel elements 16. The lugs 40 have outstanding elements 42 thereon which form pivotable engagement with outstanding elements 43 on hinge plates 39. When folding, hinge assemblies 38 move in an accordian-like fashion with the mid portion thereof collapsing outwardly in the direction of arrows 44 while channel-shaped elements 16 move inwardly in the direction of arrows 46 toward supporting structure 17. Once channel-shaped elements 16 are nested against the leading edge or structure support 17 it then becomes possible to withdraw supporting structure 19 within fuselage 14 and allow for the complete pivotable movement of airfoil structure 12 about pivot point 20. By the utilization of hinge assemblies 38, U-shaped spanwise elements 16 transfer their load to the hinge assemblies 38 so that the cumulative loads do not have to transfer through other span elements 16. Such a folding concept is advantageous to wings of tapered planform and/or thickness.

In the case of the instant invention, there are approximately 14 formed channel-shaped elements 16 per span unit as opposed to approximately 157 different units for the chordwise rib folding methods of the past. In addition, the airfoil structure 12 of this invention further simplifies not only the manufacturing but also the operation and construction of such airfoil structure by making right and left hand folding components interchangeable.

In operation when the desired retraction of the airfoil structure 12 is necessitated, the first step is to hydraulically or electrically energize actuators 22 so as to retract and nest within each other the spanwise channel-shaped elements 16. This is accomplished by the accordian like folding of hinge assemblies 38. The next step is to withdraw supporting structure 19 within fuselage 14. Once the airfoil structure 12 is in its retracted position shown at B in FIG. 1, conventional actuators 26 pivot airfoil structure 12 about pivot point 20 so as to position airfoil structure in the manner shown at C in FIG. 1 against fuselage 14 and resting on the tail of aircraft 10. The retraction of the pair of airfoil structure 12 may take place either simultaneously or in sequence depending upon the type of actuators used as well as the type of retraction required.

A further embodiment of the instant invention is shown in FIGS. 7 and 8 of the drawing. This embodiment is in the form of an airfoil structure 50 which not only contains the retractability feature of airfoil structure 12 described hereinabove but also contains the additional improvement that the airfoil structure 50 is capable of telescoping movement or retraction in the spanwise direction.

Airfoil structure 50 is made up of a two part airfoil structure in the form of telescoping components 52 and 54. It should be noted that although two parts are shown any suitable number of telescoping components may be used with this invention. The main component or root section 52 is of a similar construction to airfoil structure 12 having a non-retractable box-like section 56 of greater chordwise dimension than section 17 shown in FIGS. 1-3. Section 56 is therefore of sufficient size to accommodate retracted component 54 which is housed or telescoped therein. Each component 52 and 54, respectively, is made up of a plurality of spanwise channel shaped elements 58 identical to elements 16 which nest in the chordwise direction within themselves in the manner set forth with respect to elements 16 in airfoil structure 12. Similar to airfoil structure 12 conventional actuators 60 operate the retraction of elements 58. Likewise hinge assemblies 38 of the type shown in FIG. 6 of the drawing support the spanwise channel or U-shaped elements 58 during extension and retraction thereof. Any suitable hydraulic or electrical spanwise actuator 64 secured between components 52 and 54 is utilized to telescope outer component 54 within inner component 52 after retraction of spanwise elements 58 takes place on both components in the manner shown in FIG. 8 of the drawing. All other elements which make up airfoil structure 50 of this invention are identical to those set forth with respect to airfoil structure 12 and therefore are not set forth in detail hereinabove.

The operation of airfoil structure 50 as shown in FIGS. 7 and 8 not only involves the retraction of elements 58 within each other but also involves the movement of supporting structure 19 within fuselage 14. In addition the withdrawal of component 54 within structure 56 of component 52 can take place either before or after pivotal movement of structure 50 about pivot point 20. The embodiment of FIGS. 7 and 8 although more complex in operation and manufacture than airfoil structure 12 substantially reduces the overall spanwise dimension of the airfoil structure, an important modification when substantial reduction in space is desirable.

Although this invention has been described with reference to particular embodiments it will be understood to those skilled in the art that this invention is also capable of a variety of further embodiments within the spirit and scope of the appended claims.

We claim:

1. In an aircraft structure having a fuselage, a tail section and a pair of airfoil structures, the improvement therein residing in said airfoil structures, each of said airfoil structures capable of movement between a fully deployed position and a stowed position along side said aircraft fuselage and resting adjacent said tail section, each of said airfoil structures comprising a supporting structure extending along the span of said airfoil structure, said supporting structure being made up of at least two components, one of said components being capable of insertion within the other component in the spanwise direction, at least two sets of a plurality of spanwise elements, one of said sets of spanwise elements being operably connected to one of said components and the other of said sets of spanwise elements being operably connected to the other of said components, each of said spanwise elements being of a channel-shaped configuration having a back portion and a pair of arms, said elements being capable of nesting within one another in a retracted position, means for operably connecting each set of said spanwise elements to said supporting components in the chordwise direction, said means for connecting each set of said spanwise elements to said supporting components, respectively, comprising a plurality of hinge assemblies including intermediate hinge assemblies, each of said hinge assemblies being made up of a pair of elements, said hinge assembly elements being pivotally connected together, said intermediate hinge assemblies each having a lug fixedly secured to one of said spanwise elements, each of said lugs having outstanding elements thereon, said outstanding elements on each of said lugs being pivotally connected to one of said pair of elements of each of said hinge assemblies located adjacent thereto, each of said hinge assemblies thereby capable of folding in an accordian-like fashion with the pivotal connection of said pair of hinge assembly elements to each other collapsing in a direction away from the location of said lugs and toward the direction of said fuselage when said airfoil structure is in said retracted position, said back portions of said spanwise elements being in substantial engagement with one another in said retracted position, means operably connected between said supporting structure and each set of said spanwise elements for moving said spanwise elements in the chordwise direction between a deployed position defining an airfoil structure and said retracted position and means operably connected between said aircraft fuselage and said airfoil structure for pivoting said airfoil structure in the retracted position to a stowed position along side said fuselage and adjacent said tail section.

* * * * *